No. 748,354. PATENTED DEC. 29, 1903.
C. H. DURNING.
AUTOMATIC CONTROLLER FOR ELECTRIC PUMPS OR THE LIKE.
APPLICATION FILED JAN. 26, 1903.
NO MODEL. 4 SHEETS—SHEET 1.
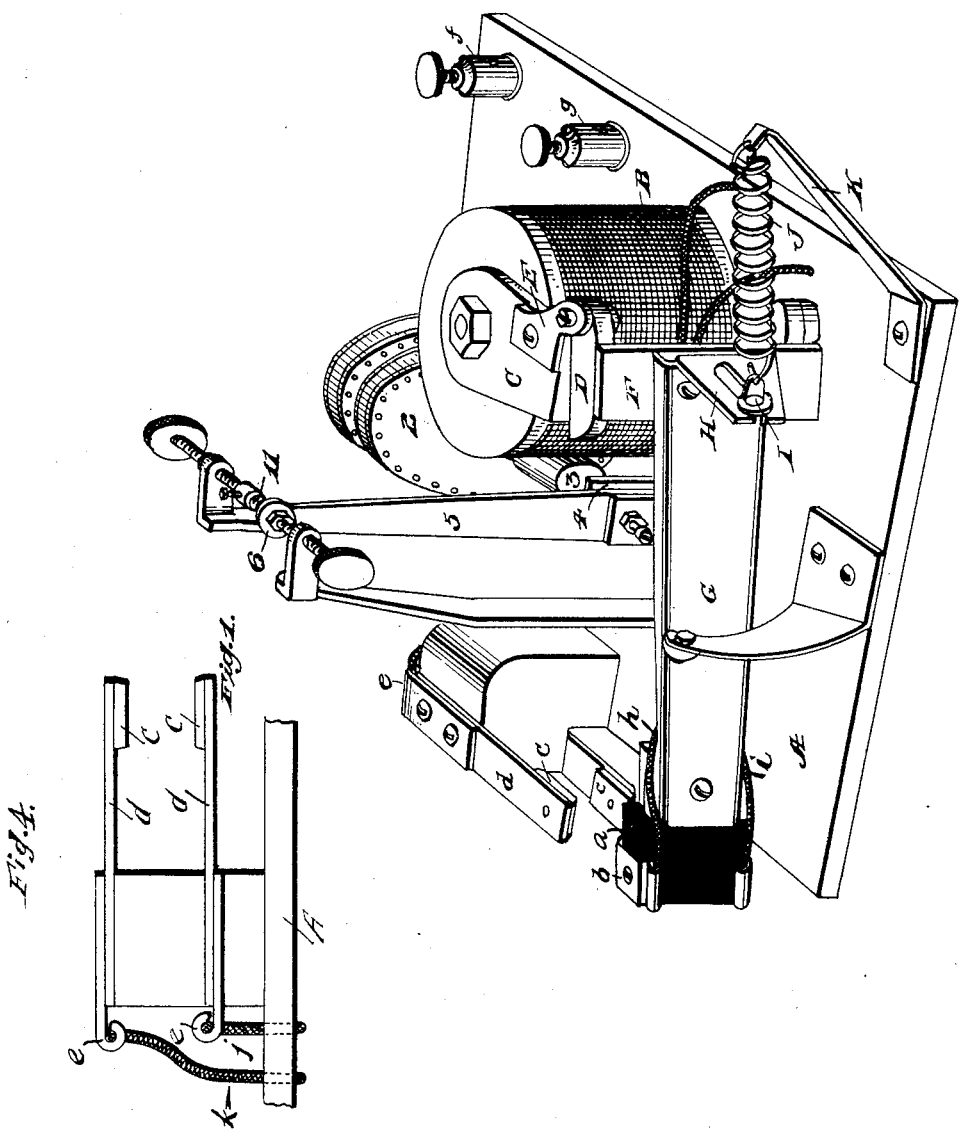

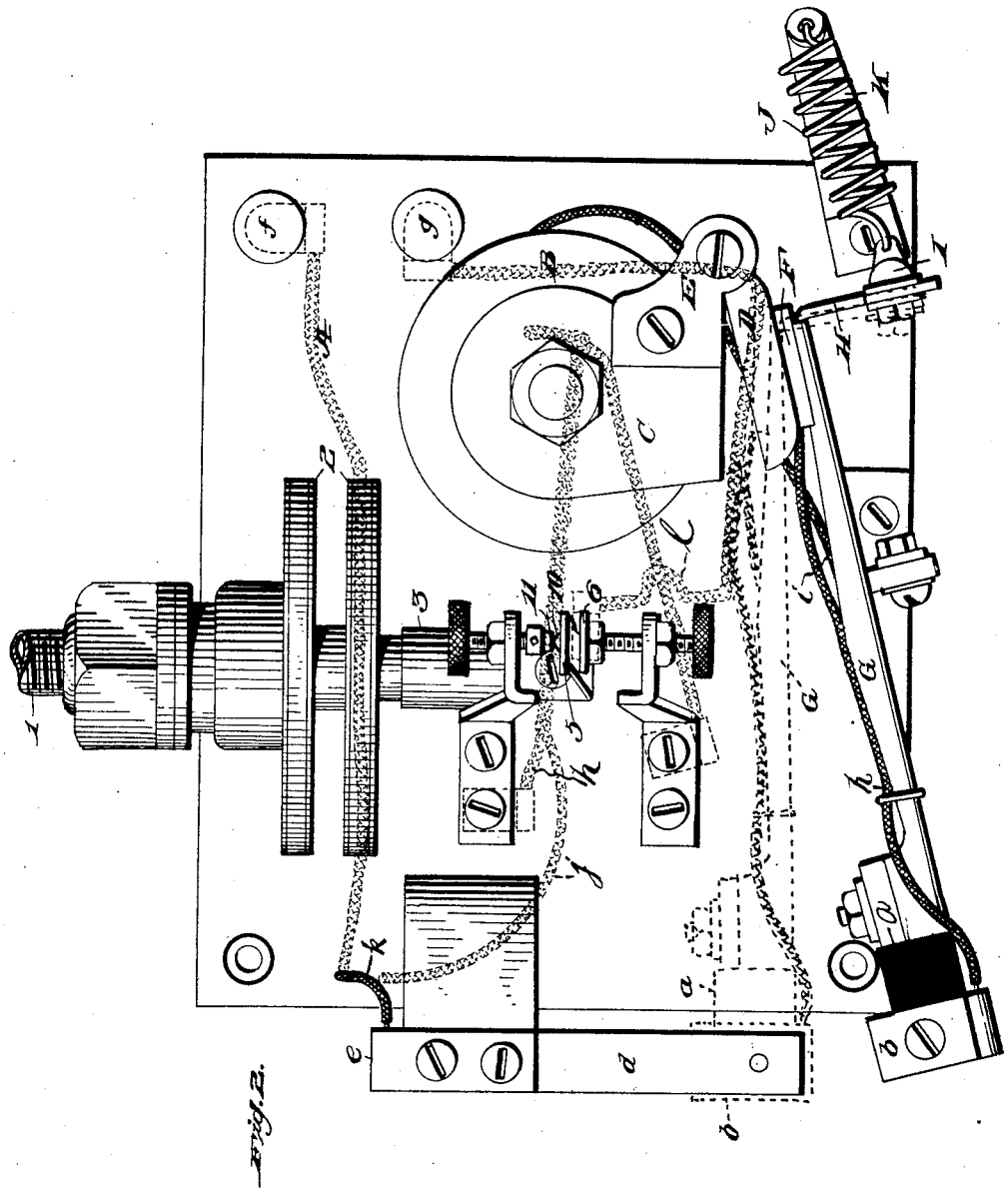

No. 748,354. PATENTED DEC. 29, 1903.
C. H. DURNING.
AUTOMATIC CONTROLLER FOR ELECTRIC PUMPS OR THE LIKE.
APPLICATION FILED JAN. 26, 1903.
NO MODEL. 4 SHEETS—SHEET 3.
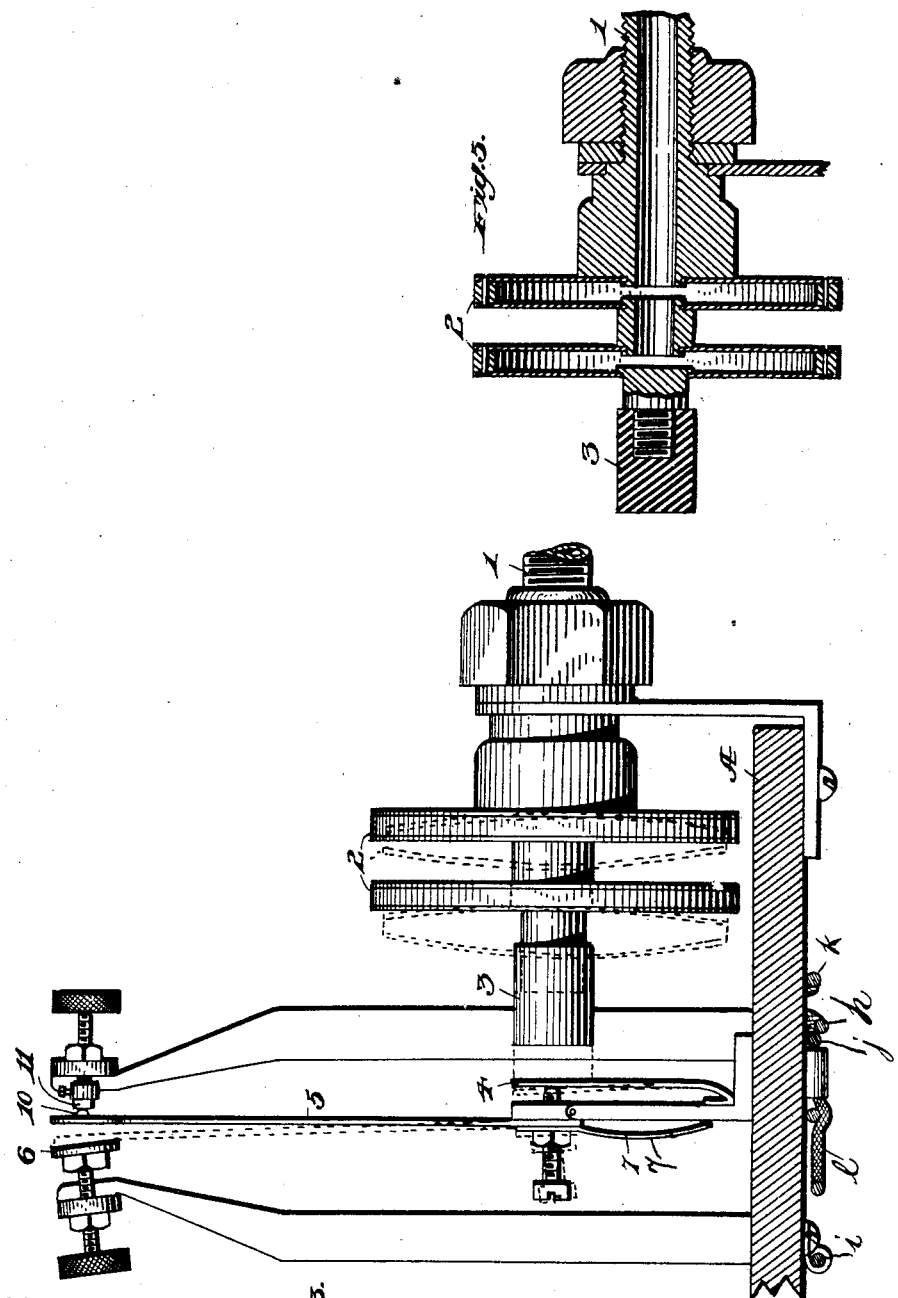

No. 748,354. PATENTED DEC. 29, 1903.
C. H. DURNING.
AUTOMATIC CONTROLLER FOR ELECTRIC PUMPS OR THE LIKE.
APPLICATION FILED JAN. 26, 1903.
NO MODEL. 4 SHEETS—SHEET 4.
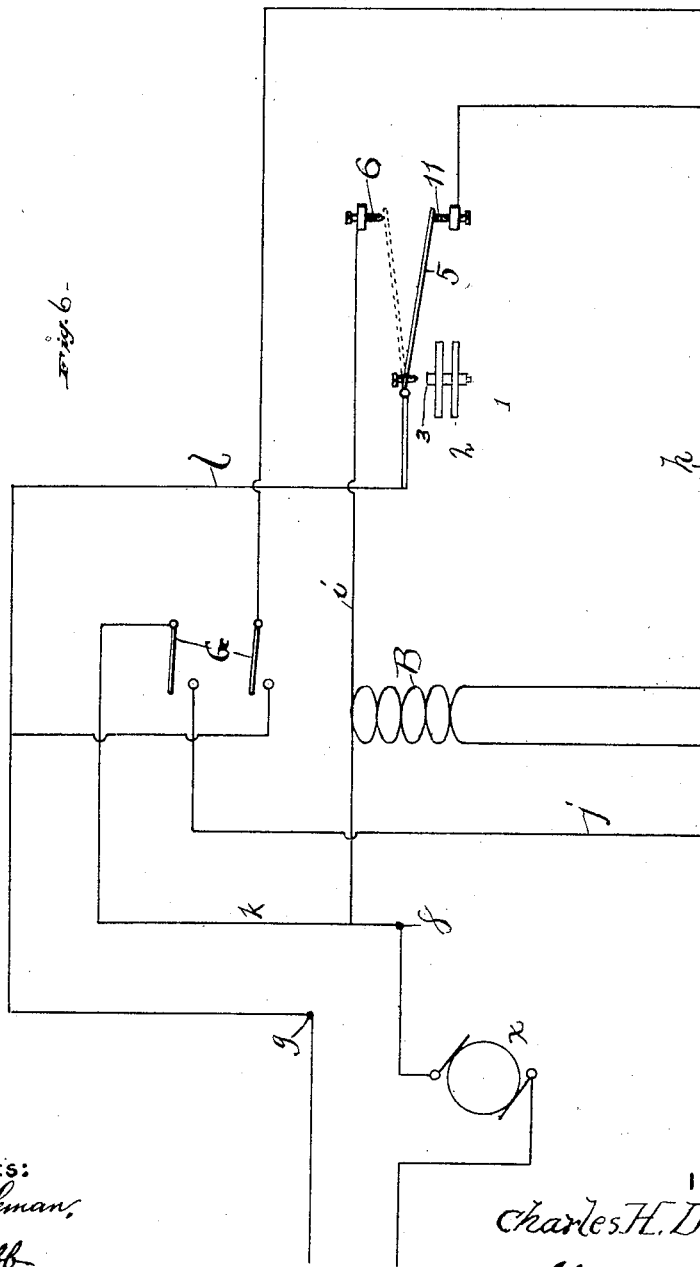
WITNESSES:
INVENTOR
Charles H. Durning
by John Roland
Atty No. 748,354. Patented December 29, 1903.

UNITED STATES PATENT OFFICE.

CHARLES H. DURNING, OF SWISSVALE, PENNSYLVANIA.

AUTOMATIC CONTROLLER FOR ELECTRIC PUMPS OR THE LIKE.

SPECIFICATION forming part of Letters Patent No. 748,354, dated December 29, 1903.

Application filed January 26, 1903. Serial No. 140,452. (No model.)

*To all whom it may concern:*

Be it known that I, CHARLES H. DURNING, a citizen of the United States of America, residing at Swissvale, in the county of Allegheny and State of Pennsylvania, have invented certain new and useful Improvements in Automatic Controllers for Electric Pumps or the Like, of which the following is a specification.

This invention relates to electric controllers; and it has reference in particular to a controller designed for use in the operation of an air-pump.

The objects of this invention are, first, to produce a controller in which the air-pressure from the pump when said pressure becomes abnormal operates a switch-actuating means for establishing or breaking a circuit to the pump-operating motor; second, to produce a controller having a magnet wound in two directions in order that the current in one coil will neutralize the magnetic influence of the current in the other coil and demagnetize the poles of the magnet when both circuits around the magnet are established; third, in the provision of a switch under the control of the magnet and a spring whereby currents are established and broken through the pump-operating motor.

Finally, the object of the invention is to produce a controller of the character noted which will possess advantages in points of efficiency and inexpensive construction.

With the foregoing and other objects in view the invention consists in the details of construction and in the arrangement and combination of parts to be hereinafter more fully set forth and claimed.

In describing the invention in detail reference will be had to the accompanying drawings, forming part of this specification, wherein like characters denote corresponding parts in the several views, and in which—

Figure 1 is a perspective view of a controller embodying the invention. Fig. 2 is a top plan view thereof. Fig. 3 is a transverse sectional view. Fig. 4 is an end view of the air-controlled switch-operating device. Fig. 5 is a sectional view of the air-controlled switch-operating device. Fig. 6 is a diagrammatic view of the circuits.

In the drawings, A indicates the base, B an electromagnet having two oppositely-wound coils, and C indicates the poles of the magnet.

The armatures D are hinged to the lugs E and connected by the bar F, said bar carrying the switch-arm G, which terminates at the rear in two parallel extensions H, between which a bolt I is adjustable. A spring J is secured to the head of the bolt, and its opposite end is attached to the arm K, projecting from the base. The spring serves to swing the arm G when the armatures are not under the influence of the poles of the magnet.

The arm G has a block $a$ of non-conducting material on its end, and switch contact-plates $b$ are secured to the block $a$. The contacts $b$ are wired by conductors $h$ $i$ through the magnet B and to the terminals of the pressure-controlled switch, to be hereinafter described. The contacts $b$ engage contacts $c$ of the spring-arms $d$, the said arms $d$ having terminal sockets $e$ with conductors $j$ and $k$ to the magnet B and binding-post $f$, respectively, the said binding-post being connected to the source of electricity. The terminal post $g$ is connected by conductor $l$ with the pressure-controlled switch and it to the magnet by conductor $h$ or $i$, according to the position of the switch-arm. The pipe 1 has a connection (not shown) to receive pressure from a pump, and when the pressure is excessive the diaphragm 2 will expand and carry the rubber tip 3 to press the spring 4, thus throwing the switch-arm 5 to the contact 6 and establishing a circuit from the terminal post $g$ by the conductor $i$ through the magnet. This current will neutralize the current in the opposite winding of the magnet, and the armature will be released, allowing the arm G under tension-spring J to swing and carry its contacts $b$ out of engagement with contacts $c$, thereby interrupting current through the switch. When the pressure becomes normal and the pump is to operate, the diaphragms return to the position shown in full lines, and the spring 7 carries the arm 5, with the platinum point 10, into engagement with the contact 11 and breaking the neutralizing-circuit through the magnet. The parts will then assume position described.

The circuit through a motor $x$ for operating the pump is controlled by the arm G and its contacts, for when the circuit is broken through said contacts the current to the outer line and to the pump-motor is interrupted. The arm G is controlled by the electromagnet and the spring, and the current to the magnet is controlled by the pressure-controlled switch.

In operation when the pump-pressure is above normal the diaphragm causes the switch-arm to be thrown to contact 6, as stated, and through the various connections the current to the motor is interrupted and the pump is stopped. The reverse action of the diaphragm through the connection described reëstablishes a current through the motor and the pump is operated.

Having fully described the invention, what I claim as new, and desire to secure by Letters Patent, is—

1. In a controller, a pressure-operated switch, an electromagnet having two series of windings opposite to each other, means for establishing and breaking circuits therethrough, terminals or poles for the magnet, a switch-arm controlled thereby, and a motor in circuit with the switch having its current controlled by said switch.

2. In a controller, a pressure-operated switch, means for establishing electric circuits by the operation of the switch, an electromagnet having two sets of windings, one opposite to the other, means whereby the pressure-controlled switch controls the electromagnet, a switch-arm controlled by the magnet, and a motor having its current controlled by the switch-arm.

3. In a controller, diaphragms suitably controlled, a switch operated thereby, an electromagnet having two sets of coils oppositely wound, means whereby the pressure-controlled switch controls the current to the magnet, a switch-arm controlled by the magnet, a motor and means whereby the switch-arm controls current to the motor.

In testimony whereof I affix my signature, in the presence of two witnesses, this 24th day of January, 1903.

CHARLES H. DURNING.

Witnesses:
JOHN NOLAND,
J. P. APPLEMAN.